United States Patent
Ho et al.

(10) Patent No.: US 7,506,087 B2
(45) Date of Patent: Mar. 17, 2009

(54) METHOD FOR CONFIGURING A PERIPHERAL COMPONENT INTERCONNECT EXPRESS (PCIE)

(75) Inventors: Kuan-Jui Ho, Hsin-Tien (TW);
Min-Hung Chen, Hsin-Tien (TW);
Hsiou-Ming Chu, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 127 days.

(21) Appl. No.: 11/604,812

(22) Filed: Nov. 28, 2006

(65) Prior Publication Data
US 2007/0283059 A1 Dec. 6, 2007

(30) Foreign Application Priority Data
Jun. 2, 2006 (TW) .............................. 95119648 A

(51) Int. Cl.
*G06F 13/00* (2006.01)
(52) U.S. Cl. .................. 710/104; 710/312; 710/313
(58) Field of Classification Search ................ 710/104, 710/105, 305, 306, 312, 313
See application file for complete search history.

(56) References Cited

U.S. PATENT DOCUMENTS

| | | | | |
|---|---|---|---|---|
| 5,574,869 A * | 11/1996 | Young et al. | ................. | 710/313 |
| 6,119,192 A * | 9/2000 | Kao et al. | .................... | 710/311 |
| 6,587,868 B2 * | 7/2003 | Porterfield | ................... | 709/203 |
| 6,691,224 B1 * | 2/2004 | Yeh et al. | ........................ | 713/2 |
| 7,080,164 B2 * | 7/2006 | Jacobs et al. | ................... | 710/8 |
| 7,159,060 B2 * | 1/2007 | Martin et al. | ............... | 710/302 |
| 7,325,125 B2 * | 1/2008 | Yeh et al. | ........................ | 713/1 |
| 7,366,872 B2 * | 4/2008 | Lake et al. | ................... | 711/220 |
| 2002/0147868 A1 * | 10/2002 | Tsai | .......................... | 710/104 |

OTHER PUBLICATIONS

PCI Express Technology, Dell, 2004.*
Creating a PCI Express Interconnect, Intel Corporation, 2002.*

* cited by examiner

*Primary Examiner*—Khanh Dang
(74) *Attorney, Agent, or Firm*—Rosenberg, Klein & Lee

(57) ABSTRACT

The present invention relates to a method for configuring a Peripheral Component Interconnect Express (PCIE). A plurality of PCIE parameters are stored in a storage unit. When a computer system starts up, a North Bridge chip is driven to read the PCIE parameters in the storage unit for configuring the PCIE. According to the configuration method of the present invention, when the computer system starts up, the North Bridge chip and the storage unit are enabled first. Then, the North Bridge chip is driven to read the PCIE parameters. Finally, the North Bridge chip proceeds with initialization according to the PCIE parameters to configure PCIE.

20 Claims, 3 Drawing Sheets

US 7,506,087 B2

METHOD FOR CONFIGURING A PERIPHERAL COMPONENT INTERCONNECT EXPRESS (PCIE)

FIELD OF THE INVENTION

The present invention relates to a method for configuring transport interfaces, and particularly to a method for configuring Peripheral Component Interconnect Express (PCIE).

BACKGROUND OF THE INVENTION

Peripheral Component Interconnect (PCI) is the most common used transport interface in computer systems. However, with advancement of computer technologies, the processing speed of central processing units increases substantially, and thereby the transport speed of peripheral devices has to increase as well. Consequently, a Peripheral Component Interconnect Express (PCIE), which is different from PCI, is developed. PCIE transports data serially so that connected devices do not need to share bandwidth. In addition, it also supports hot-plug, which brings considerable convenience for users.

In the PCIE specification, North Bridge chip of a computer system need to connect with coupled PCIE peripheral devices according to PCIE parameters configured in the North Bridge chip when the computer system starts up. The PCIE parameters include power limits, scramble mechanisms, and timing and driving levels of transport signals. Because the PCIE parameters described above are configured in North Bridge chip when they are manufactured, users cannot modify the parameters in accordance with different using requirements and using environments. For example, differences in environmental temperatures influence timing and driving levels of transport signals so that signals cannot be transported securely between North Bridge chip and PCIE peripheral devices. Thereby, performance and stability of PCIE peripheral devices will be affected. Accordingly, in order to enhance performance and stability of PCIE peripheral devices, it is indispensable to modify PCIE parameters in North Bridge chip for re-configuring the PCIE.

In general, parameters in a computer system are modifies in terms of software. However, because North Bridge chip need to connect with connected PCIE peripheral devices when the computer system starts up and the central processing unit is not normal yet, the PCIE parameters can not modified by using software before connection.

Accordingly, it is imperative to provide a method for re-configuring PCIE when a computer system starts up and before North Bridge chip complete connecting with the PCIE peripheral devices.

SUMMARY

Methods for configuring a Peripheral Component Interconnect Express (PCIE) are provided. An embodiment of the method for configuring a Peripheral Component Interconnect Express (PCIE), a plurality of PCIE parameters storing in a storage unit, and which are read by a North Bridge chip in booting, comprising steps of: enabling the North Bridge chip and the storage unit; driving the North Bridge chip to read the PCIE parameters in the storage unit; initializing the North Bridge chip according to the PCIE parameters for configuring the PCIE; and enabling a PCIE peripheral device to connect with the North Bridge chip.

An other one embodiment of method for configuring a Peripheral Component Interconnect Express (PCIE), a plurality of PCIE parameters storing in a storage unit, and which are read by a North Bridge chip in booting, comprising steps of: enabling the North Bridge chip, the storage unit, and a PCIE peripheral device; forcing the North Bridge chip to suspend a connection with the peripheral device; driving the North Bridge chip to read the PCIE parameters in the storage unit; initializing the North Bridge chip according to the PCIE parameters for configuring the PCIE; and resuming the connection with the North Bridge chip and the PCIE peripheral device.

An other one embodiment of method for configuring a Peripheral Component Interconnect Express (PCIE), a plurality of PCIE parameters storing in a storage unit, and which are read by a North Bridge chip in booting, comprising steps of: enabling the North Bridge chip and the storage unit; driving the North Bridge chip to read the PCIE parameters in the storage unit; and initializing the North Bridge chip according to the PCIE parameters for configuring PCIE.

DETAILED DESCRIPTION

Figure 1:
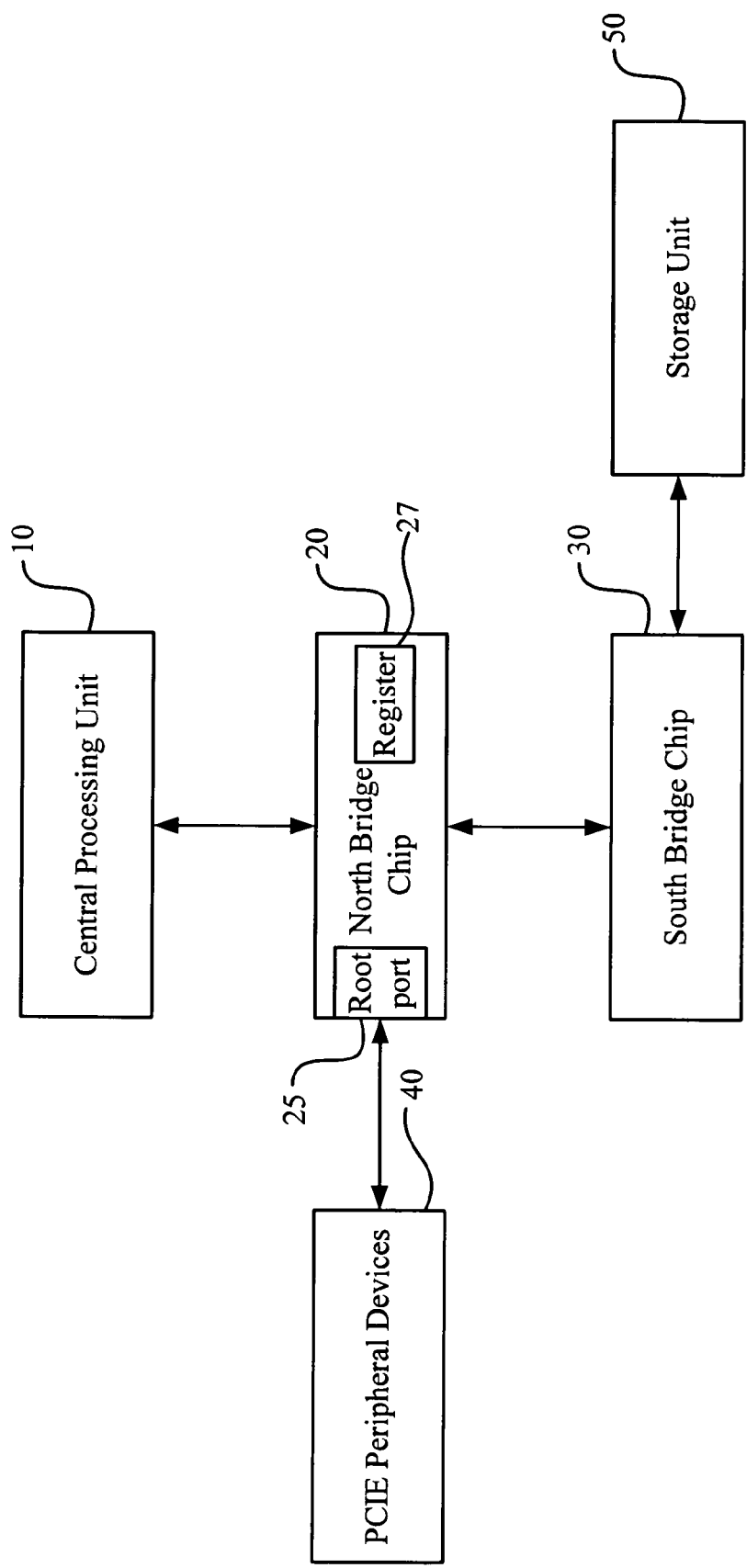
FIG. 1 is a block diagram according to a preferred embodiment of the present invention.

FIG. 1 is a block diagram of a computer system according to a preferred embodiment of the present invention. As shown in the figure, a central processing unit 10, a North Bridge chip 20, and a South Bridge chip 30 are adapted in the computer system according to the present invention. The North Bridge chip 20 couples to the central processing unit 10 and the South Bridge chip 30, respectively. Besides, a root port 25 is adapted in the North Bridge chip 20 for coupling with a PCIE peripheral device 40. The South Bridge chip 30 couples to a storage unit 50, which can be a memory. According to the present invention, a plurality of PCIE parameters used by the North Bridge chip 20 for configuring PCIE is stored in the storage unit 50. The plurality of PCIE parameters can be stored in the storage unit 50 in the form of serial initialization packet (SIP). The storage unit 50 according to the present invention is a read-only memory (ROM), thereby the SIP in the present embodiment is also named as ROMSIP.

When the computer system starts up, the North Bridge chip 20 will drive the South Bridge chip 30 to read the ROMSIP in the storage unit 50, and to transport the ROMSIP to the North Bridge chip 20. Then, the North Bridge chip 20 processes with initialization according to the PCIE parameters of the ROMSIP. The PCIE parameters are written to a plurality of corresponding registers 27 of the North Bridge chip 20 to finish configuring PCIE when the North Bridge chip 20 proceeds with initialization. The root port 25 of the North Bridge chip 20 proceeds with connecting with the PCIE peripheral device 40 according to the PCIE parameters in the registers 27 when the root port 25 connect with the PCIE peripheral device 40.

Figure 2:
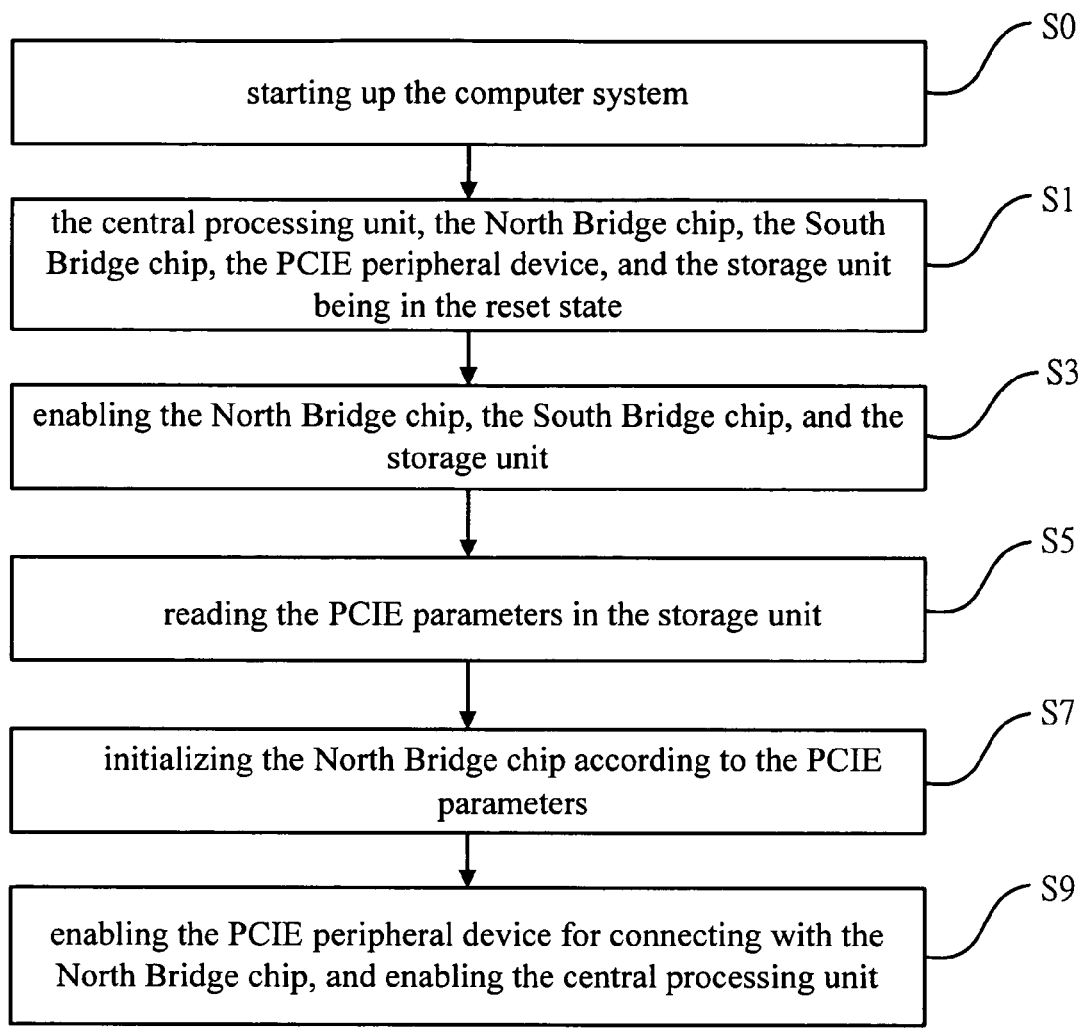
FIG. 2 is a flowchart according to a preferred embodiment of the present invention.
Figure 3:
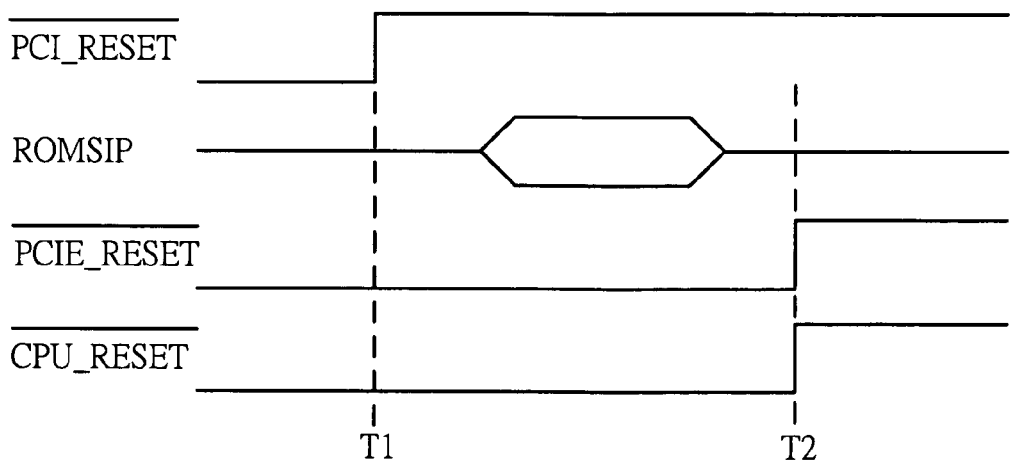
FIG. 3 is a timing diagram according to another preferred embodiment of the present invention.

In the following, please refer to FIG. 2 and FIG. 3 simultaneously. FIG. 2 and FIG. 3 are a flowchart and a timing diagram according to a preferred embodiment of the present invention, respectively. As shown in the step S0, When the computer just starts up, the bus between the North Bridge chip 20 and the South Bridge chip 30 does not operate normally yet, thereby, as shown in the step S1, the central processing unit 10, the North Bridge chip 20, the South Bridge chip 30, the PCIE peripheral device 40, and the storage unit 50 are all in the reset state. In this step, when the computer system starts up, the motherboard used for configuring the North Bridge chip 20 and the South Bridge chip 30 will transmit a low level signal to PCI reset signal pins $\overline{PCI\_RESET}$, as shown in FIG. 3, of the North Bridge chip 20 and the South Bridge chip 30 via its corresponding PCI reset signal pin coupled with the North Bridge chip 20 and the South Bridge chip 30. Thereby, the North Bridge chip 20 and the South Bridge chip 30 are informed that the bus does not operate normally yet, and consequently are driven to the reset state. At this time, the North Bridge chip 20 will also, as shown in FIG. 3, transmit a low level signal to a PCIE reset signal pin $\overline{PCIE\_RESET}$ of the PCIE peripheral device 40, and a low level signal to a CPU reset signal pin $\overline{CPU\_RESET}$ of the central processing unit 10, respectively, to drive the PCIE peripheral device 40 and the central processing unit 10 to the reset state.

After the bus between the North Bridge chip 20 and the South Bridge chip 30 operates normally, the motherboard will transmit a high level signal to PCI reset signal pins $\overline{PCI\_RESET}$, at time $T_1$ as shown in FIG. 3, of the North Bridge chip 20 and the South Bridge chip 30 via its corresponding PCI reset signal pin coupled with the North Bridge chip 20 and the South Bridge chip 30. That is, the reset signal $\overline{PCI\_RESET}$ is changed from a low level signal to a high level signal. At this time, as shown in the step S3, the North Bridge chip 20 and the South Bridge chip 30 will be enabled, and the storage unit 50 will be enabled by the South Bridge chip 30 as well. Meanwhile, the North Bridge chip 20 and the South Bridge chip 30 will connect with each other. Afterwards, as shown in the step S5, the ROMSIP in the storage unit 50 is read. In this step, the North Bridge chip 20 drives the South Bridge chip 30 to read the ROMSIP and to transport to the North Bridge chip 20. Then, as shown in the step S7, the North Bridge chip 20 is initialized according to the PCIE parameters of ROMSIP. That is to say, the North Bridge chip 20 writes the PCIE parameters to the plurality of registers 27 located in the North Bridge chip 20 correspondingly. Thereby, configuration of PCIE is accomplished.

Next, at time $T_2$ as shown in FIG. 3, the North Bridge chip 20 drives the PCIE reset signal $\overline{PCIE\_RESET}$ to a high level signal for PCIE peripheral device 40. That is, the PCIE reset signal $\overline{PCIE\_RESET}$ is changed from a low level signal to a high level signal for executing the S9, in which the root port 25 of the North Bridge chip 20 connects with the PCIE peripheral device 40. The root port 25 connects with the PCIE peripheral device 40 according to the PCIE parameters in the registers 27. In addition, at time $T_2$, the North Bridge chip 20 also drives the CPU reset signal $\overline{CPU\_RESET}$ to a high level signal for the central processing unit 10 in order to enable the central processing unit 25 and to make the computer system operate normally.

By means of the configuration method according to the present invention, the PCIE parameters to be modified can be updated in advance to the storage unit 50 for substituting the original ones. In the updating method describe above, the PCIE parameters provided by vendors can be downloaded beforehand from their websites and be stored in the storage unit 50 for overwriting the formerly stored PCIE parameters. Hence, when the computer system reboots, the North Bridge chip 20 reads the updated PCIE parameters, and proceeds with initialization according to the updated PCIE parameters to re-configure PCIE. Thereby, the problem of being unable to update PCIE parameters and consequently being unable to re-configure PCIE in the prior art can be solved. The performance and stability of using the PCIE peripheral device 40 can be enhanced accordingly.

Figure 4:
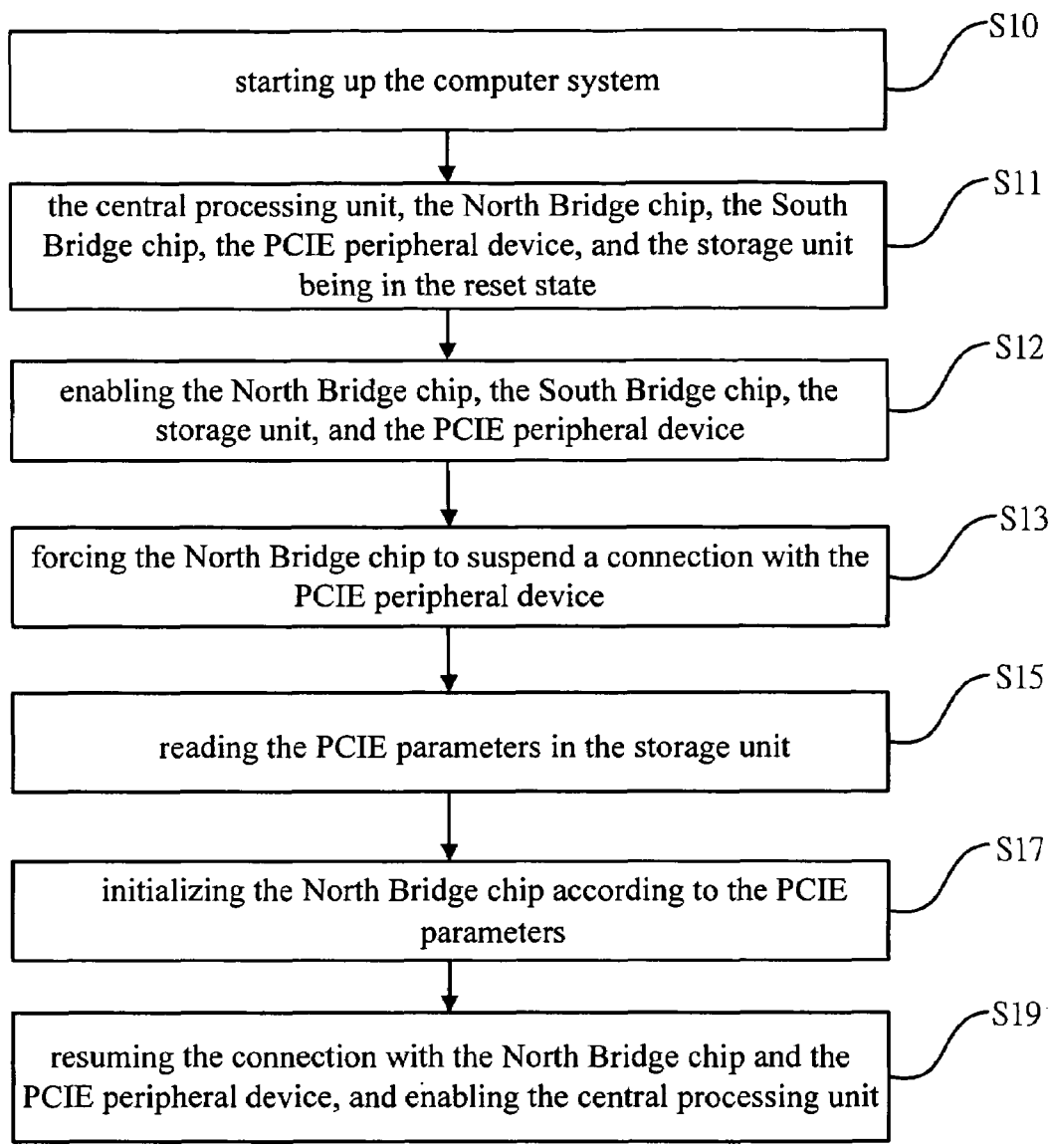
FIG. 4 is a flowchart according to a preferred embodiment of the present invention.
Figure 5:
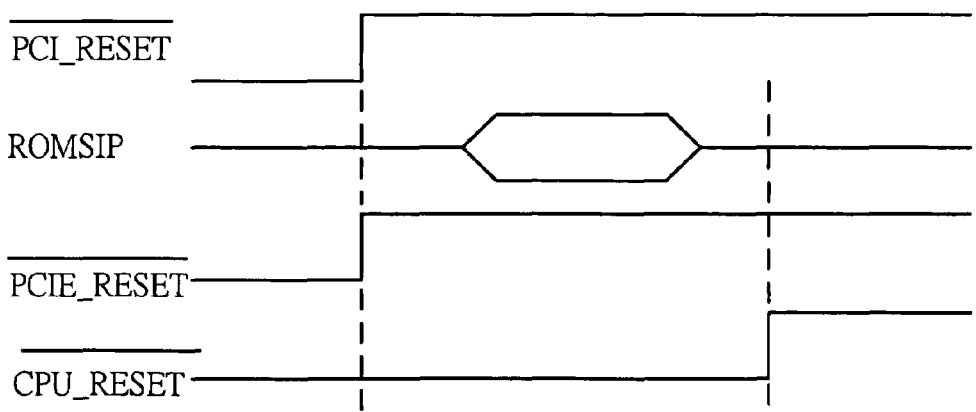
FIG. 5 is a timing diagram according to another preferred embodiment of the present invention.

Please refer to FIG. 4 and FIG. 5. FIG. 4 and FIG. 5 are a flowchart and a timing diagram according to another preferred embodiment of the present invention, respectively. The difference between the embodiments of FIG. 2 and of FIG. 4 is that in the embodiment of FIG. 2, when the computer system starts up, the PCIE peripheral device 40 is not enabled until initialization of the North Bridge chip 20 is completed, so that the North Bridge chip 20 can connect with the PCIE peripheral device 40. On the contrary, in the embodiment of FIG. 4, when the North Bridge chip 20 is enabled, the PCIE peripheral device 40 is enabled as well. However, the North Bridge chip 20 does not connect with the PCIE peripheral device 40 until the North Bridge chip 20 has read the PCIE parameters in the storage unit 50 and has completed initialization. In the following, the embodiment of FIG. 4 is described in detail.

As shown in the step S10, when the computer system starts up, the motherboard will transmit a low level signal to the PCI reset signal pins $\overline{PCI\_RESET}$ of the North Bridge chip 20 and the South Bridge chip 30 as shown in FIG. 5. At this time, as shown in the step S11, the North Bridge chip 20 and the South Bridge chip 30 is in the reset state. Meanwhile, the storage unit 50 is in the reset state as well. In addition, the North Bridge chip 20 will transmit a low level signal to the CPU reset signal $\overline{CPU\_RESET}$ for the central processing unit 10 such that the central processing unit 10 is driven in the reset state. In order to enable the PCIE peripheral device 40 and the North Bridge chip 20 simultaneously, the present embodiment controls the PCIE peripheral device 40 via the motherboard. When the computer system starts up, the motherboard will transmit a low level signal to the PCIE reset signal pin $\overline{PCIE\_RESET}$ of the PCIE peripheral device 40 via the corresponding connected pin such that the PCIE peripheral device 40 is in the reset state.

After the bus between the North Bridge chip 20 and the South Bridge chip 30 is in normal, the step S12 is executed, in which the North Bridge chip 20, the South Bridge chip 30, the PCIE peripheral device 40, and the storage unit 50 are all enabled. In this step, at time $T_1$ as shown in FIG. 5, the motherboard transmits a high level signal to the PCI reset signal pin $\overline{PCI\_RESET}$ of the North Bridge chip 20, and a high level signal to the PCIE reset signal pin $\overline{PCIE\_RESET}$ of the PCIE peripheral device 40, respectively, to enable the North Bridge chip 20 and the PCIE peripheral device 40. Besides, the PCI reset signal $\overline{PCI\_RESET}$ is transmitted to the South Bridge chip 30 to enable the South Bridge chip 30. Meanwhile, the storage unit 50 is enabled by the South Bridge chip 30 as well.

Furthermore, when the PCI reset signal $\overline{PCI\_RESET}$ the motherboard transmits to the North Bridge chip 20 is changed to a high level signal and the North Bridge chip 20 is thereby enabled, the North Bridge chip 20 is forced to suspend a connection with the PCIE peripheral device 40 as shown in the step S13. Then, the North Bridge chip 20 executes the step S15 to read the PCIE parameters stored in the storage unit 50. That is, the South Bridge chip 30 is driven to read the ROMSIP and transport it to the North Bridge chip 20. Next, the North Bridge chip 20 executes the step S17 to initialize according to the PCIE parameters to complete configuring the PCIE. Because the North Bridge chip 20 has finished configuring PCIE, it will resume the connection with the PCIE peripheral device 40 as shown in the step S19. At time $T_2$ as shown in FIG. 5, the North Bridge chip 20 will transmit a high level signal to the CPU reset signal CPU_RESET for the central processing unit 10 so that the central processing unit 10 is enabled to make the computer system operate in normal.

To sum up, the method for configuring PCIE according to the present invention is applied in cases in which PCIE has to be configured when a computer system starts up and before the central processing unit is enabled. The method for configuring PCIE according to the present invention stores PCIE parameters used for initializing the North Bridge chip to configure PCIE in the storage unit. When the computer system starts up, the North Bridge chip and the storage unit are enabled first. Then, the North Bridge chip is driven to read the PCIE parameters. Afterwards, the North Bridge chip initializes according to the PCIE parameters to configure PCIE and thereby the North Bridge chip can connect with the PCIE peripheral device. If PCIE configuration is to be modified, it is only necessary to update the PCIE parameters in the storage unit. Thus, when the computer system reboots, the North Bridge chip reads updated PCIE parameters for initializing, and thereby PCIE configuration is modified.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

What is the claimed is:

1. A method for configuring a Peripheral Component Interconnect Express (PCIE) during the booting of a computer system, wherein the computer system includes a North Bridge Chip, a South Bridge Chip, and a Central Processing Unit (CPU), said method comprising the steps of:
    storing a plurality of PCIE parameters in a storage unit external to said North Bridge Chip and said South Bridge Chip;
    during the booting of said computer system and prior to initializing of said CPU, enabling the North Bridge chip and the storage unit;
    driving the North Bridge chip to read the plurality of the PCIE parameters from the storage unit;
    initializing the North Bridge chip according to the plurality of the PCIE parameters for configuring the PCIE; and
    enabling a PCIE peripheral device to connect with the North Bridge chip in accordance with said plurality of the PCIE parameters read from said storage unit.

2. The method of claim 1, wherein the step of enabling the North Bridge chip and the storage unit further comprises the steps of:
    enabling the South Bridge chip, and
    driving the South Bridge chip by the North Bridge chip for reading the plurality of the PCIE parameters in the storage unit for being transported to the North Bridge chip.

3. The method of claim 1, wherein a serial initialization packet (SIP) with the plurality of the PCIE parameters in the storage unit is read by the North Bridge chip.

4. The method of claim 1, wherein the plurality of the PCIE parameters are correspondingly written into a plurality of registers in the North Bridge chip in the step of initializing the North Bridge chip.

5. The method of claim 1, wherein the North Bridge chip controls the operation of said PCIE peripheral device.

6. The method of claim 1, wherein the step of enabling the PCIE peripheral device further comprises:
    upon enablement of said PCIE peripheral device, enabling said central processing unit of said computer system.

7. The method of claim 1, further comprising the step of:
    updating the plurality of the PCIE parameters stored in the storage unit for modifying the PCIE configuration.

8. A method for configuring a Peripheral Component Interconnect Express (PCIE) during the booting of a computer system, wherein the computer system includes a North Bridge Chip, a South Bridge chip. and a Central Processing Unit (CPU), said method comprising the steps of:
    storing a plurality of PCIE parameters in a storage unit external to said North Bridge Chip and said South Bridge Chip;
    during the booting of said computer system and prior to initializing of said CPU, enabling the North Bridge chip, the storage unit, and a PCIE peripheral device;
    suspending connection of the North Bridge chip with the PCIE peripheral device;
    driving the North Bridge chip to read the plurality of the PCIE parameters from the storage unit;
    initializing the North Bridge chip according to the plurality of the PCIE parameters read from the storage unit for configuring the PCIE; and
    resuming the connection between the North Bridge chip and the PCIE peripheral device.

9. The method of claim 8, wherein the step of enabling the North Bridge chip, the storage unit, and the PCIE peripheral device further comprises the steps of:
    enabling the South Bridge chip, and
    driving the South Bridge chip by the North Bridge chip for reading the plurality of the PCIE parameters in the storage unit for being transported to the North Bridge chip.

10. The method of claim 8, wherein a serial initialization packet (SIP) with the plurality of PCIE parameters in the storage unit are read by the North Bridge chip.

11. The method of claim 8, wherein the plurality of the PCIE parameters are correspondingly written into a plurality of registers in the North Bridge chip in the step of initializing the North Bridge chip.

12. The method of claim 8, further comprising the step of:
    after the step of resuming the connection with the North Bridge chip and the PCIE peripheral device, enabling said CPU of said computer system.

13. The method of claim 8, further comprising the step of:
    updating the plurality of the PCIE parameters stored in the storage unit for modifying the PCIE configuration.

14. A method for configuring a Peripheral Component Interconnect Express (PCIE) during the booting of a computer system, wherein the computer system includes a North Bridge Chip, a South Bridge Chip, and a Central Processing Unit (CPU), said method comprising the steps of:
    storing a plurality of PCIE parameters in a storage unit external to said North Bridge Chip and said South Bridge Chip;
    during the booting of said computer system and prior to initializing of said CPU, enabling the North Bridge chip and the storage unit;
    driving the North Bridge chip to read the plurality of the PCIE parameters from the storage unit; and
    initializing the North Bridge chip according to the plurality of the PCIE parameters for configuring the PCIE.

15. The method of claim 14, further comprising the step of:
    enabling a PCIE peripheral device to connect with the North Bridge chip.

16. The method of claim 14, further comprising the steps of:
  enabling a PCIE peripheral device, and suspending the connection of the North Bridge chip with the PCIE peripheral device until the initialization of the North Bridge chip is completed.

17. The method of claim 14, further comprising the step of:
  enabling a the South Bridge chip for transporting the plurality of the PCIE parameters from the storage unit to the North bridge chip by driving the South Bridge chip by the North Bridge chip.

18. The method of claim 14, wherein a serial initialization packet (SIP) with the plurality of the PCIE parameters in the storage unit is read by the North Bridge chip.

19. The method of claim 14, further comprising the step of:
  enabling the CPU of the computer system upon configuring of the PCIE.

20. The method of claim 14, further comprising the step of:
  updating the plurality of the PCIE parameters stored in the storage unit for modifying the PCIE configuration.

* * * * *